2,929,817
Patented Mar. 22, 1960

2,929,817

SYNTHESIS OF RESERPINE AND INTERMEDIATES

Robert Joly, Montmorency, and Robert Bucourt, Villiers-le-Bel, France, assignors to Les Laboratoires Français de Chimiothérapie, Paris, France, a corporation of France No Drawing. Application April 11, 1958
Serial No. 727,779

Claims priority, application France May 21, 1957

6 Claims. (Cl. 260—287)

This invention relates to a new and improved method for the synthesis of alkaloids of the reserpine series. More particularly, the invention concerns improved methods for the preparation of reserpine, deserpidine, and rescinnamine, and new intermediates useful in the preparation of these alkaloids.

The presently known reserpine synthesis described by Woodward and his coworkers (J. Am. Chem. Soc., 1956, p. 2023) prepares reserpine by the esterification of methyl reserpate with trimethoxybenzoyl chloride in accordance with the equation:

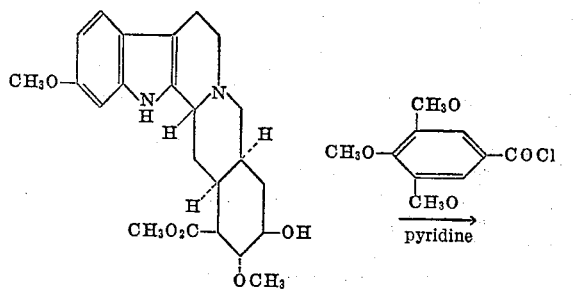

Methyl reserpate

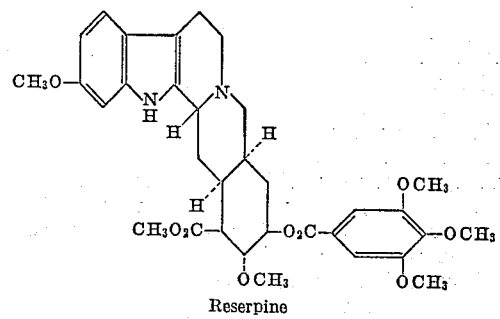

Reserpine

The methyl reserpate used in the Woodward synthesis is itself prepared from the acetylated racemic lactam 18β - acetoxy - 11,17α - dimethoxy - 3 - oxo - 16β - methoxy-carbonyl-2,3-seco-20α-yohimbane having the formula:

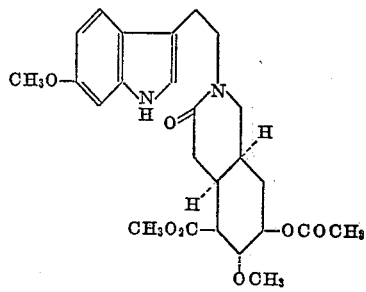

This lactam starting material is converted into methyl reserpate by the following six-step synthesis:
(a) Cyclization of the lactam by phosphorus oxychloride with formation of a yohimbane structure;

(b) Reduction of the compound cyclized with sodium borohydride into racemic methyl O-acetyl-isoreserpate;
(c) Resolving of the racemic ester into methyl O-acetyl-isoreserpate;
(d) Saponification of methyl O-acetyl-iso-reserpate into isoserpic acid;
(e) Lactonization of isoreserpic acid into isoreserpic lactone;
(f) Transposition of the isoreserpic lactone into reserpic lactone by means of pivalic acid;
(g) Methanolysis of the reserpic lactone into methyl reserpate.

It will be apparent that, not counting the resolving step, this synthesis comprises six stages to produce methyl reserpate, and seven stages to produce reserpine.

In accordance with the present invention, there has been developed a greatly simplified and more efficient method which eliminates at least three steps of the presently known seven stage process outlined above. Our new method, moreover, is one of general applicability to the synthesis not only of reserpine itself, but also of other alkaloids of the reserpine series, such as, for example, deserpidine and rescinnamine. Our new method has led, moreover, to the preparation of numerous new intermediate compounds not previously known or described. Our novel simplified method of synthesis makes possible the realization of the synthesis of reserpine on an industrial scale.

Our novel method comprises essentially the steps of condensing an 18β-hydroxy-17α-methoxy-16β-methoxy-carbonyl-3-oxo-2,3-seco-20α-yohimbane, which may be either optically active or racemic, and the 10- and 11-positions of which may be substituted by a hydrogen or a methoxy group and the 9- and 12-positions also substituted, with an esterifying functional derivative of an acid, such as an acid chloride, anhydride, or mixed anhydride, in the presence of a tertiary base, to obtain the corresponding ester at the 18-position, isolating and purifying the resulting ester, cyclizing the ester by the action of a suitable cyclizing agent such as, for example, phosphorus oxychloride, to obtain an alkaloid unsaturated at the 3,4-position, separating and purifying said alkaloid in the form of its perchlorate, and finally reducing the double bond at the 3,4-position by means of a known reducing agent, as for example, zinc and acetic acid, to obtain the desired alkaloid.

The 18-β-hydroxy-yohimbane starting material in the foregoing synthesis may be obtained either by deacetylation of the corresponding lactam, or by methanolysis of the corresponding lactone.

The general synthetic method of our invention may be more readily understood by reference to the following equations, in which R and R' are hydrogen or methoxy, and R'' is an acyl group, such as, for example, a trimethoxybenzoyl group or a trimethoxycinnamoyl group.

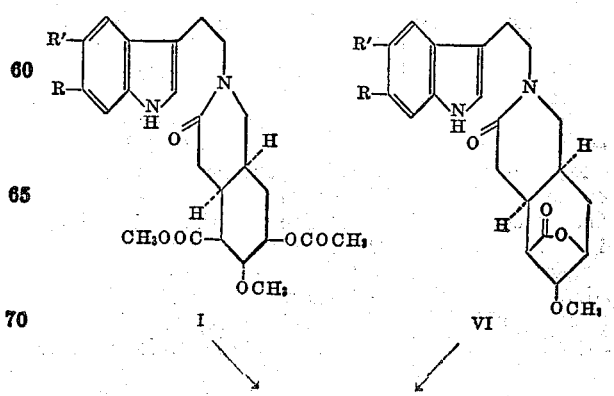

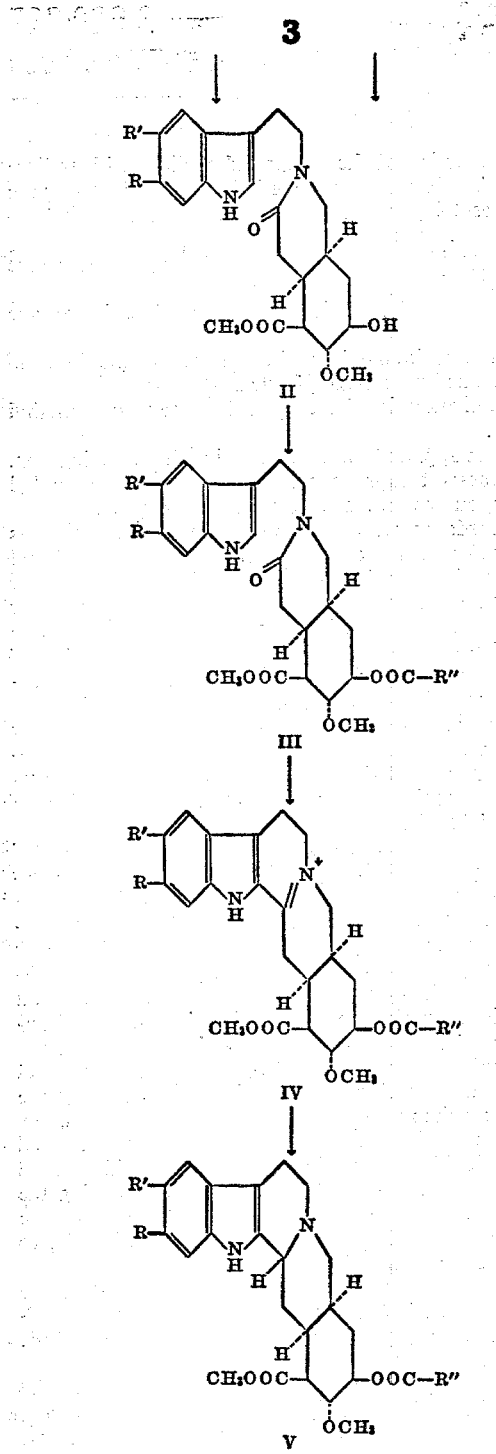

levorotatory 3,4-dehydroreserpidine, followed by reduction with zinc and acetic acid to reserpidine.

The alcohol (II) which serves as the starting point of our novel syntheses is preferably prepared by methanolysis from lactam (I) or lactone (VI) in the presence of sodium methylate, but it may also be prepared by other methods which permit a selective deacetylation of lactam (I) or the opening of lactone (VI) without alteration of its structural configuration.

The preparation of lactones (VI), such as, for example, the lactone of 18β-hydroxy-11,17α-dimethoxy-16β-carboxy-3-oxo-2,3-seco-20α-yohimbane, is described in copending application Serial No. 693,028, filed October 29, 1957, and comprises the saponification of dextrorotatory 18β-acetoxy-11,17α-dimethoxy-3-oxo - 16β-methoxycarbonyl-2,3-seco-20α-yohimbane, forming free hydroxyl and carboxyl, followed by lactonization.

Among the lactams (I) which serve for the preparation of the starting alcohols (II) by deacetylation, the compound 18β-acetoxy-17α-methoxy - 16β - methoxycarbonyl-3-oxo-2,3-seco-20α-yohimbane is a new compound, the preparation of which we have described in Example 1 below.

While it is preferable to use for the syntheses the alcohol (II) in the optically active enantiomorphous state, as produced from the previously resolved acetylated lactam (I) or from the optically active lactone (VI), the alcohol (II) may also be used in the racemic state, in accordance with this invention, and the racemic form subsequently resolved into optically active forms by known methods at any suitable stage of our novel process.

The esterification of the alcohol (II) may be carried out by means of suitable acids, such as various organic acids in the form of their functional derivatives which are adapted for esterification, such as, for example, the acid chlorides, anhydrides, and mixed anhydrides. Examples of esterification agents which may be advantageously employed include 3,4,5-trimethoxybenzoyl chloride and 3,4,5-trimethoxycinnamoyl chloride, but the mention of these agents is not to be regarded as limiting. The esterification may be carried out in the presence of a suitable solvent, such as a tertiary base, of which there may be mentioned as examples, pyridine and methyl-ethyl-pyridine. The esters (III) may be purified by crystallization or by chromatography.

The cyclization of the esterified products (III) may be effected by means of any suitable cyclization agents, such as, for example, phosphorus oxychloride, phosphines, or thionyl chloride, and the like, to form the 3,4-dehydro products (IV). These dehydro products (IV) may be isolated in the form of their perchlorates, which can then be reduced to the desired alkaloids by means of any suitable reducing agent, such as, for example, zinc and acetic acid, to obtain compounds identical with the natural alkaloids.

Thus, for example, by means of the process outlined in the foregoing equations, reserpine can be prepared from dextrorotatory 18β-hydroxy-11,17α-dimethoxy-16β-methoxycarbonyl-3-oxo-2,3-seco-20α-yohimbane by esterification with 3,4,5-trimethoxybenzoyl chloride followed by cyclization into 3,4-dehydroreserpine and reduction of the latter to reserpine.

Similarly, rescinnamine may be prepared from the same starting material by esterification with 3,4,5-trimethoxycinnamoyl chloride and cyclization with phosphorus oxychloride to yield the levorotatory 3,4-dehydrorescinnamine, followed by reduction with zinc and acetic acid to rescinnamine. Deserpidine may be prepared analogously from dextrorotatory 18β-hydroxy-17α-methoxy-16β-methoxycarbonyl - 3 - oxo - 2,3-seco-20α-yohimbane by esterification with trimethoxybenzoyl chloride and cyclization with phosphorus oxychloride to form the The novel process of our invention is illustrated particularly in respect to our improved method for the synthesis of reserpine, which may be better understood by reference to the following equations:

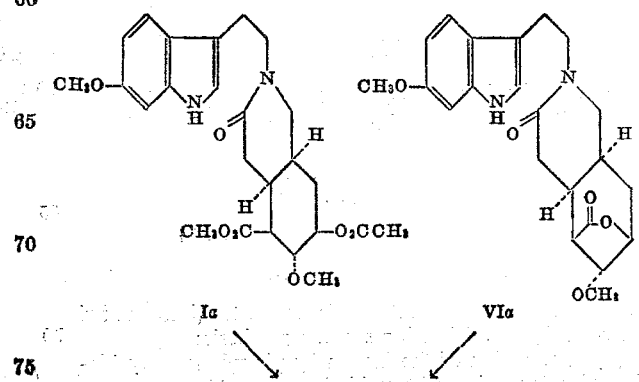

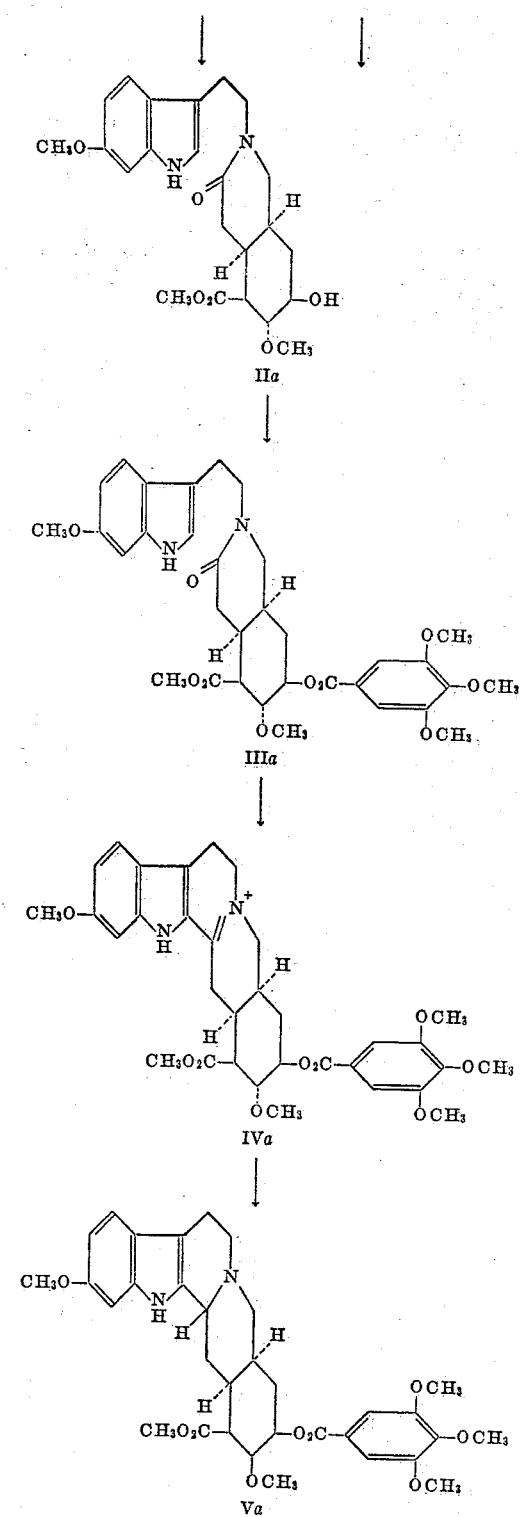

The method for synthesis of reserpine in accordance with our invention thus comprises these steps:

(a) Deacetylation of the optically active lactam (Ia) to form dextrorotatory 18β-hydroxy-11,17α-dimethoxy-3-oxo-16β-methoxycarbonyl-2,3-seco-20α-yohimbane (IIa);

(b) Esterification of alcohol (IIa) by trimethoxybenzoyl chloride into levorotatory 18β-(3',4',5'-trimethoxy)-benzoyloxy-11,17α-dimethoxy-3-oxo-16β-methoxycarbonyl-2,3-seco-20α-yohimbane (IIIa);

(c) Cyclization of compound (IIIa) by means of phosphorus oxychloride into 3,4-dehydroreserpine (IVa);

(d) Reduction of dehydroreserpine (IVa) into reserpine (Va) by means of zinc and acetic acid according to known methods.

It is, of course, also possible within the scope of the invention to use as a starting product levorotatory (VIa) which also yields the dextrorotatory alcohol (IIa) by methanolysis. The preparation of this lactone (VIa) is described in copending application Serial No. 693,028, filed October 29, 1957, and comprises saponification of dextrorotatory 18β-acetoxy-11,17α-dimethoxy-3-oxo-16β-methoxycarbonyl-2,3-seco-20α-yohimbane to set free carbonyl and hydroxy, followed by lactonization.

The 3,4-dehydroreserpine (IVa) may be isolated in the form of its perchlorate and is identical with the dehydroreserpine prepared by Weissenborn and Diassi (J. Am. Chem. Soc., 1956, vol. 78, p. 2022) by oxidation with mercuric acetate of 3-isoreserpine, and isolated in the form of nitrate.

The following examples serve to illustrate the invention but are not to be considered as limiting its scope as defined in the appended claims. The melting points given in the examples are instantaneous melting points determined on the Maquenne block.

*Example 1.—Preparation of levorotatory 18β-acetoxy-17α-methoxy-16β-methoxycarbonyl-3-oxo-2,3-seco-20α-yohimbane (chloroform) (I) (R=R'=H)*

A suspension of 8.5 g. of 1β-carboxymethyl-2β-methoxycarbonyl-3α-methoxy-4β-acetoxy-6β-formyl-cyclohexane in 34 cc. of methylene chloride is chilled to a temperature between —10° and 0° C.; a solution of diazomethane in methylene chloride is added thereto under mechanical stirring and a stream of nitrogen until it is possible to detect a small excess of this methylating agent which is to esterify the starting acid-aldehyde. The methylene chloride is distilled in vacuo, with the temperature not exceeding +5° C., until the volume of the starting suspension has been reached. The solution is then chilled to —10° C., —15° C., and 4.8 g. of tryptamine are added under stirring; the stirring is continued at the same temperature for three hours, the solution is chilled to —20° C., —30° C., and is diluted by the addition of 34 cc. of anhydrous methanol; 1.3 g. of potassium borohydride are then added, and stirring is continued for 15 minutes at a temperature of —10° C.; the temperature is then allowed to rise again to 20° C. within about half an hour. When the reduction is completed, the excess potassium borohydride is destroyed by the addition of acetic acid until the pH is 4–5, and evaporation to dryness is carried out in vacuo. The resulting pasty residue is taken up with 80 cc. of chloroform and 30 cc. of water. This is followed by decanting and extracting the aqueous layer again with chloroform, the chloroform extracts are combined, are first washed with 2 N hydrochloric acid, then with an aqueous solution saturated with sodium bicarbonate, and finally with water until neutral. The chloroform extract is dried over anhydrous sodium sulfate, filtered and evaporated to dryness in vacuo. The residue is taken up while hot with 60 cc. of isopropanol, of which about 25 cc. are distilled in vacuo. Compound (I) (R=R'=H) crystallizes. It is allowed to crystallize one night, is centrifuged, washed with isopropanol and dried. This produces 7.8 g. of compound I (R=R'=H), M.P.=180.5° C., $[\alpha]_D^{20}=14.5°$ C.±1.5° (c=1%, chloroform). The product is insoluble in water, in aqueous dilute acids, not very soluble in alcohol, ether and benzene, soluble in acetone and chloroform. It is easily recrystallized in isopropanol or in two volumes of methylisobutylketone. The product changes neither melting point nor rotatory power after recrystallization.

*Analysis.*—$C_{24}H_{30}O_6N_2=442.50$. — Calculated: C%, 65.14; H%, 6.83; O%, 21.70; N%, 6.33. Found: C%, 65.1; H%, 6.8; O%, 21.5; N%, 6.3.

This product has not been previously described in the literature.

*Example 2.—Preparation dextrorotatory 18β-hydroxy-17α - methoxy - 16β - methoxycarbonyl - 3 - oxo - 2,3-seco-20α-yohimbane (tetrahydrofuran with 50% water) (II) (R=R'=H) from levorotatory 18β-acetoxy-17α-methoxy - 16β - methoxycarbonyl - 3 - oxo - 2,3 - seco-20α-yohimbane (chloroform) (I) (R=R'=H)*

The following mixture is heated on reflux for one hour:

1.68 g. of compound (I) (R=R'=H) prepared according to Example 1
17 cc. of methanol
3.4 cc. of an anhydrous sodium methylate solution containing 5 g. of sodium methylate per liter.

The solution is cooled to 20° C., acidified by the addition of 0.1 cc. of acetic acid to pH 4–5, and 10 cc. of methanol are distilled under nitrogen. Upon cooling, the desired product (II) (R=R'=H) crystallizes. 16 cc. of water are added gradually and under stirring; the solution is separated (centrifuged), washed with water, centrifuged and dried. This produces 1.45 g. (or a yield of 94%) of the desired product (II), M.P.=192.5–193.5° C. For analysis it is recrystallized in boiling methanol, M.P.=193–194° C., $[\alpha]_D^{20}=+38°$ C.±1.5° (c=1%, tetrahydrofuran with 50% water).

The product is insoluble in water, aqueous dilute acids, aqueous dilute alkalis and benzene, difficultly soluble in acetone, chloroform and ether, not very soluble in ethanol, soluble in 9 volumes of boiling methanol, soluble in tetrahydrofuran with 50% water.

Analysis.—$C_{22}H_{28}O_5N_2$=400.46.—Calculated: C%, 65.98; H%, 7.05; O%, 19.98; N%, 7.00. Found: C%, 66.1; H%, 7.0; O%, 20.2; N%, 7.2.

This compound has not been previously described in the literature.

*Example 3.—Preparation of levorotatory 18β-(3',4',5'-trimethoxy benzoyloxy) - 17α - methoxy - 16β - methoxycarbonyl-3-oxo 2,3-seco-20α-yohimbane (chloroform) (III) (R=R'=H and R''=—$C_6H_2(OCH_3)_3$) from dextrorotatory 18β - hydroxy - 17α - methoxy-16β - methoxycarbonyl - 3 - oxo - 2,3 - seco - 20α-yohimbane (tetrahydrofuran with 50% water) (II) (R=R'=H)*

6 g. of compound (II) (R=R'=H) prepared according to Example 2, dissolved in 60 cc. of anhydrous pyridine are heated with 15 g. of trimethoxybenzoyl chloride for 16 hours at 75° C. under a stream of nitrogen. The solution is cooled to 20° C., is increased by 60 cc. of water, is stirred for half an hour and is extracted with methylene chloride. The extract is washed with dilute hydrochloric acid until the pH is about 1.5, then washed with water, ammonia, and again with water, dried over magnesium sulfate, then filtered and evaporated to dryness. The resulting resin is purified by chromatography over alumina. It is dissolved in benzene and passed over 400 g. of neutral alumina and is then subjected to a first elution with methylene chloride (800 cc.) which yields a resinous product. A second elution with methylene chloride with 1% methanol yields a partially crystallized product which is purified by dissolution in acetone (50 cc.) and precipitation in 500 cc. of ice water. This yields 7 g. of product (III) (R=R'=H and

R''=$C_6H_2(OCH_3)_3$)

M.P.=130° C., $[\alpha]_D^{20}=-40°$ C.±1.5° (c=1%, chloroform). The product takes the form of microscopic prisms solvating with water. The compound is slightly hygroscopic. Left in air it fixes 1 to 1.7% water. It is insoluble in water, aqueous dilute acids, aqueous dilute alkalis and isopropyl ether, not very soluble in ether and carbon tetrachloride, soluble in benzene and chloroform, acetone and ethanol.

Analysis. — $C_{32}H_{38}O_9N_2$=594.64.—Calculated: C%, 64.63; H%, 6.44; O%, 24.22; N%, 4.71. Found: C%, 64.8; H%, 6.4; O%, 24.5; N%, 4.6.

This compound has not been previously described in the literature.

*Example 4.—Preparation of levorotatory 18β-(3',4',5'-trimethoxy benzoyloxy) - 17α - methoxy - 16β - methoxycarbonyl - 3,4 - dehydro - 20α - yohimbane (chloroform) (IV) (R=R'=H and R''=$C_6H_2(OCH_3)_3$) from levorotatory 18β - (3',4',5' - trimethoxybenzoyloxy) - 17α - methoxy - 16β - methoxycarbonyl - 3 - oxo-2,3 - seco - 20α - yohimbane (chloroform) (III) (R=R'=H and R''=—$C_6H_2(OCH_3)_3$)*

3 g. of ester (III) prepared according to Example 3, and 6 cc. of phosphorus oxychloride are mixed under a stream of nitrogen while being stirred and are slowly refluxed. Dissolution takes place. After three and a half hours of boiling the solution is cooled to 20° C. and diluted with 6 cc. of acetone; 120 g. of crushed ice and 6 cc. of 55° Baumé perchloric acid are then introduced slowly into the mixture while stirring. The resulting yellow perchlorate of (IV) is centrifuged and is washed with water until the pH of the wash waters reaches 4. In order to free it from traces of 3,4-dehydro deserpidine hydrochloride and phosphate which it contains, it is dissolved in 25 cc. of tetrahydrofuran with 50% water; the resulting solution is added to 350 cc. of an ice-water mixture containing 10 cc. of 55° Baumé perchloric acid and is stirred 10 minutes whereupon the yellow crystalline precipitate is separated. It is washed with water until the pH of the wash water reaches 3–4, and is dried in vacuo. This produces 3.23 g., or a yield of 94%, of the perchlorate of (IV) (R=R'=H and R''=$C_6H_2(OCH_3)_3$) which may be used directly for reduction to deserpidine. For the purpose of analysis, it is purified by dissolution in chloroform or methylene chloride and addition of ethyl acetate. The product then takes the form of small light-yellow rodlets; it is solvated at 4 to 4.5%, 2% of which represent water from the atmosphere, M.P.=214° C., $[\alpha]_D^{20}=-50°\pm3$ (c=1%, aqueous tetrahydrofuran with 55% water) for the solvated product, which corresponds to a $[\alpha]_D^{20}=-52°$ C.±3° for the dry substance. The product is insoluble in water, ether, benzene and absolute alcohol, not very soluble in aqueous methanol and chloroform, very soluble in methylene chloride and aqueous tetrahydrofuran with 50% water. The ultraviolet spectrum determined and calculated on the dry product in N/10 alcoholic hydrochloric acid shows:

λ max.: 356 mμ     ε=24,400
λ max.: 253–254 mμ     ε=15,800

Analysis.—$C_{32}H_{37}O_{12}N_2Cl$=677.10.—Calculated: C%, 56.76; H%, 5.51; O%, 28.36; N%, 4.13; Cl%, 5.24. Found: C%, 56.8; H%, 5.5; O%, 28.7; N%, 4.3; Cl%, 5.2.

Pure deserpidine is produced by reducing the above perchlorate with zinc and acetic acid.

*Example 5.—Preparation of dextrorotatory 18β-(3',4',5'-trimethoxycinnamoyloxy - 11,17α - dimethoxy - 16β-methoxycarbonyl - 3 - oxo - 2,3 - seco - 20α - yohimbane (chloroform) (III) (R=OCH_3, R'=H, R''=CH=CH—$C_6H_2$ $(OCH_3)_3$ from 18β - hydroxy - 11,17α-dimethoxy 16β-methoxycarbonyl-3-oxo-2,3-seco-20α-yohimbane (IIa) (R=OCH_3, R'=H)*

1 g. of dextrorotatory compound (IIa) (pyridine) (R=OCH_3, R'=H) described in Example 7 is esterified by means of 2.8 g. of 3,4,5-trimethoxycinnamoyl chloride under the conditions described in Example 3. After chromatography and separation of the fraction which is rich in the desired compound (III), the solution is evaporated to dryness and taken up with a minimum of acetone, whereupon it is added to a large quantity of water. This is followed by centrifuging, empasting in 15 to 20 cc. of ice water, centrifuging and drying in vacuo at 70° C. This yields 67% of a product sufficiently pure for cyclization with phosphorus oxychloride. In order to obtain the pure product for analysis, a second crystallization is carried out in aqueous acetone. After drying in vacuo at 70° C.: M.P.=123–125° C., $[\alpha]_D^{20}=+7°$ C. ±1.5° (chloroform). The undried product retains approximately 1.7% of solvation water. Compound (III) thus produced is insoluble in water, aqueous dilute acids, aqueous dilute alkalis and ether, very soluble in alcohol, acetone, benzene and chloroform.

Analysis.—$C_{35}H_{42}O_{10}N_2=650.71$.—Calculated: C%, 64.59; H%, 6.51; O%, 24.58; N%, 4.31. Found: C%, 64.5; H%, 6.5; O%, 24.7; N%, 4.2.

This compound has not been previously described in the literature.

Example 6.—Preparation of levorotatory 3,4-dehydrorescinnamine (tetrahydrofuran with 50% water)

(IV) (R=OCH₃, R'=H, R''
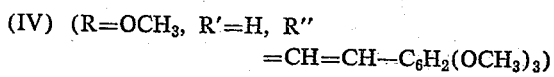
=CH=CH—C₆H₂(OCH₃)₃)

from dextrorotatory 18β-(3',4',5'-trimethoxycinnamoyloxy) - 11,17α - dimethoxy - 16β - methoxycarbonyl- 3 - oxo - 2,3 - seco - 20α - yohimbane (chloroform)

(III) (R=OCH₃, R'=H, R''
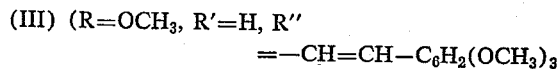
=—CH=CH—C₆H₂(OCH₃)₃

4 cc. of phosphorus oxychloride are added under a stream of nitrogen to 2 g. of completely desolvated compound (III) prepared according to Example 5; without interrupting the gaseous stream the solution is boiled on reflux for two hours. It is allowed to cool to room temperature, diluted with 2 cc. of acetone and quickly poured into a mixture of 80 g. of ice and 4 cc. of 55° Baumé perchloric acid. The resulting light-yellow suspension is centrifuged, empasted several times with 15 to 20 cc. of water until the pH of the wash water is 4–5. It is then centrifuged and dried in vacuo, thereby producing, with a theoretical yield, 2.26 g. of 3,4-dehydrorescinnamine perchlorate.

For analysis, this perchlorate is purified by dissolution in methylene chloride and addition of benzene until turbidity persists, which is continued up to three volumes of benzene in relation to the methylene chloride. The solution is allowed to cool, is separated, filtered and washed with benzene and dried, M.P.=190° C.±2°. The product is solvated to about 8%, 5% of which represents water from the atmosphere, $[\alpha]_D^{20}=-116°$ C. ±3 (c=1%, tetrahydrofuran with 55% of water), which for the desolvated product corresponds to a $[\alpha]_D^{20}=-126°$ C.±3°.

The ultraviolet spectrum on a product solvated to 6.6% determined in N/10 ethanol(ic) hydrochloric acid shows:

λ max. 314 mμ; ε=19,900, or in desolvated product 21,400

λ max. 268 mμ; ε=9,550, or in desolvated product 10,250

λ max. 389 mμ; ε=22,850, or in desolvated product 24,500

The product is insoluble in water, aqueous dilute acids, ether and benzene, not very soluble in alcohol, very soluble in acetone and chloroform.

Analysis.—$C_{35}H_{41}O_{13}N_2Cl=733.22$.—Calculated: C%, 57.33; H%, 5.64; O%, 28.37; N%, 3.82; Cl%, 4.83. Found: C%, 57.2; H%, 5.8; O%, 28.1; N%, 3.8; Cl%, 5.1.

This product has not been previously described in the literature.

Example 7.—Preparation of dextrorotatory 18β-hydroxy- 11,17α - dimethoxy - 3 - oxo - 16β - methoxycarbonyl- 2,3 - seco - 20α - yohimbane (IIa) from dextrorotatory 18β - acetoxy - 11,17α - dimethoxy - 3 - oxo - 16β- methoxycarbonyl 2,3-seco-20α-yohimbane (Ia)

A solution of 120 cc. of anhydrous methanol comprising 0.1 g. of sodium methylate is prepared; therein are dissolved, while hot, 10 g. of compound (Ia) $[\alpha]_D^{20}=31°±2$ (c=0.5% ethanol), the preparation of which has been described in copending application, Serial No. 693,028, filed October 29, 1957, comprising of a cyclization of the condensation product of the levorotatory methyl ester of 1β-carboxymethyl 2β-methoxycarbonyl - 3α - methoxy - 4β - acetoxy - 6β - formylcyclohexane with 6-methoxytryptamine, whereupon the solution is heated under reflux for one hour. It is then cooled, and the pH is brought to 5 by addition of acetic acid (about 1 cc.). The solution is concentrated to about half the volume by distillation of the solvent and is cooled to about 10° C. Compound (IIa) crystallizes. The preciptation is completed by addition of 100 cc. of water, followed by centrifuging, washing with water and drying. This produces 8.1 g. of compound (IIa) (or a yield of 89%). Recrystallization is carried out in methanol. M.P.=188–189° C., $[\alpha]_D^{20}=+31°$ C. (c=0.5%, pyridine).

Analysis. — $C_{23}H_{30}O_6N_2=430$. — Calculated: C%, 64.16; H%, 7.02; O%, 22.30; N%, 6.51. Found: C%, 63.9; H%, 7.1; O%, 22.4; N%, 6.5.

This product has not been previously described in the literature.

Example 8.—Preparation of dextrorotatory 18β-hydroxy- 11,17α - dimethoxy - 3 - oxo - 16β - methoxycarbonyl- 2,3 - seco - 20α - yohimbane (IIa) from the levorotatory lactone of 18β-hydroxy-11,17α-dimethoxy-3-oxo- 16β - carboxy - 2,3 - seco - 20α - yohimbane (VIa)

2 g. of lactone (VIa), M.P.=175° C., $[\alpha]_D^{20}=-83°$ C. (c=0.25%, ethanol) are dissolved in 100 cc. of anhydrous methanol, and 12 cc. of a sodium methylate solution comprising 1 mg. of Na per cc. of methanol are added. The solution is heated on reflux for two hours, is cooled to 20° C., is acidified with acetic acid until the pH is 5, whereupon the methanol is expelled in vacuo. The residue is dissolved in methylene chloride, and the solution is washed with dilute ammonia until the pH is 10, then with water and is finally dried over magnesium sulfate. After filtration and distillation of the methylene chloride, the residue is recrystallized in acetone and produces 2 g. (or a yield of 92%) of compound (IIa) identical with the product of Example 7 in every respect.

Example 9.—Preparation of racemic 18β-hydroxy-11, 17α - dimethoxy - 3 - oxo - 16β - methoxycarbonyl- 2,3 - seco - 20α - yohimbane (IIa) from the racemic lactone of 18β - hydroxy - 11,17α - dimethoxy - 3- oxo - 16β - carboxy - 2,3 - seco - 20α - yohimbane (VIa)

The method described in Example 8 is followed, but the starting material used is racemic lactone (VIa). This produces the racemic compound (IIa), M.P.=175° C., then 198–200° C., which takes the form of white crystals, insoluble in water and ether, soluble in chloroform and benzene.

Analysis.—$C_{23}H_{30}O_6N_2=430$.—Calculated: C%, 64.16; H%, 7.02; O%, 22.30; N%, 6.51. Found: C%, 64.1; H%, 7.0; O%, 21.8; N%, 6.6.

This compound has not been previously described in the literature.

*Example 10.—Preparation of levorotatory 18β-(3'-4'-5'-trimethoxy)-benzoyloxy-11,17α-dimethoxy-3-oxo 16β-methoxycarbonyl-2,3-seco-20α-yohimbane (IIIa) from dextrorotatory 18β-hydroxy-11,17α-dimethoxy-3-oxo-16β-methoxycarbonyl-2,3-seco-20α-yohimbane (IIa)*

8 g. of compound (IIa), M.P.=188–189° C., $[\alpha]_D^{20}$=+31° C. (c=0.5%, pyridine) prepared according to Examples 7 and 8 are dissolved in 80 cc. of pyridine and heated with 20 g. of 3,4,5-trimethoxybenzoyl chloride for 16 hours at 75° C. under a stream of nitrogen. The solution is cooled to 20° C., 80 cc. of water are added, stirring is continued for 30 minutes, and extraction is carried out with methylene chloride. The extract is washed with dilute hydrochloric acid until the pH is about 1.5, then with water, with ammonia, with water, is dried over magnesium sulfate, then filtered and evaporated to dryness. The resulting resin is purified by chromatography over alumina. It is dissolved in benzene and passed over 500 g. of neutral alumina. A first elution with 1000 cc. of methylene chloride yields 2 g. of resin, which does not crystallize directly. A second elution with 1000 cc. of methylene chloride containing 1% methanol yields, after having been distilled to dryness, taken up with 80 cc. of acetone and precipitated in 600 cc. of water, separated and dried, 8 g. of the desired compound (IIIa) corresponding to a yield of 69%.

Compound (IIIa) thus prepared shows the following constants: M.P.=126–129° C., $[\alpha]_D^{20}$=—370 C. (c=1%, chloroform).

*Analysis.*—$C_{33}H_{39}O_{10}N_2$=624.67.—Calculated: C%, 63.5; H%, 6.3; O%, 25.67; N%, 4.49. Found: C%, 63.3; H%, 6.4; O%, 25.6; N%, 4.4.

This product has not been previously described in the literature.

*Example 11.—Preparation of racemic 18β-(3',4',5'-trimethoxy)-benzoyloxy-11,17α-dimethoxy-3-oxo-16β-methoxycarbonyl-2,3-seco-20α-yohimbane (IIIa) from racemic 18β-hydroxy-11,17α-dimethoxy-3-oxo-16β-methoxycarbonyl-2,3-seco 20α-yohimbane (IIa)*

800 mg. of the racemic compound (IIa) prepared according to Example 9 are esterified under the conditions described in Example 10. The extract in methylene chloride washed and dried as described is evaporated to dryness, taken up with benzene and chromatographed over 50 g. of neutral alumina. Elution with 100 cc. of methylene chloride yields 200 mg. of a resin which does not crystallize when taken up with solvents. A second elution with 100 cc. of methylene chloride containing 1% of methanol yields, having been distilled to dryness and crystallized from ethyl acetate-ether mixture, 800 mg. of the racemic compound (IIIa) corresponding to a yield of 69%, M.P.=178° C. A new crystallization from the same solvent mixture raises the melting point to 180° C.

*Analysis.*—$C_{33}H_{39}O_{10}N_2$=624.67.—Calculated: C%, 63.5; H%, 6.3; O%, 25.67; N%, 4.49. Found: C%, 63.6; H%, 6.4; O%, 25.0; N%, 4.8.

The product which is insoluble in water and ether, soluble in acetone, benzene and chloroform, has not been previously described in the literature.

*Example 12.—Preparation of 3,4-dehydroreserpine (IVa) from levorotatory 18β-(3',4',5'-trimethoxy) benzoyloxy-11,17α-dimethoxy-3-oxo 16β-methoxycarbonyl-2,3-seco 20α-yohimbane (IIIa)*

A solution of 4 g. of compound (IIIa), $[\alpha]_D^{20}$=—37° C. prepared according to Example 10 in 8 cc. of phosphorus oxychloride is heated on reflux under a stream of nitrogen for two hours. The solution which has at first a green color, turns dark orange-red. The solution is cooled and is introduced into a mixture of 150 g. of ice and 8 cc. of 55° Baumé perchloric acid under a nitrogen atmosphere and while being stirred. Separation and washing with water follows. Drying in vacuo produces 4.46 g. of crude 3,4-dehydroreserpine perchlorate, corresponding to a yield of 98%. The product can be purified by recrystallization by being dissolved in chloroform or methylene chloride and by then adding benzene or ethyl acetate. The 3,4-dehydroreserpine perchlorate thus purified melts at 230° C., $[\alpha]_D^{20}$=—128° C. (c=1%, aqueous tetrahydrofuran containing 55% water), and can be converted into any known derivative of 3,4-dehydroreserpine.

*Analysis.*—$C_{33}H_{39}O_{13}N_2Cl$=707.11.—Calculated: C%, 56.05; H%, 5.56; N%, 3.96. Found: C%, 56.01; H%, 5.62; N%, 4.04.

This product has not been previously described in the literature.

Ultra-violet spectrum in 95% alcohol: λ max. 390 mμ, 266 mμ; ε 25,000, 17,100.

The reduction of this perchlorate by means of zinc and acetic acid according to Weisenborn and Diassi (J. Am. Chem. Soc., 1956, 78, 2022), produces pure reserpine.

We claim:

1. In the process of preparing 3α and 3β epimers of 20α-yohimbanes of the following structural formula

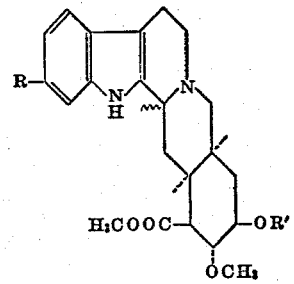

wherein R is a member selected from the group consisting of hydrogen and the methoxyl group and R' is an acyl radical selected from the group consisting of 3,4,5-trimethoxy benzoyl and 3,4,5-trimethoxy cinnamoyl radicals, the steps which comprise heating and 18β-hydroxy-17α-methoxy-16β-methoxy carbonyl-3-oxo-2,3-seco-20α-yohimbane of the formula

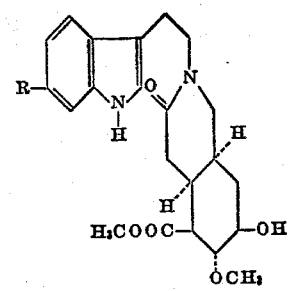

wherein R is a member selected from the group consisting of hydrogen and the methoxyl group, with a carboxylic acid chloride selected from the group consisting of 3,4,5-trimethoxy benzoylchloride and 3,4,5-trimethoxy cinnamoylchloride in the presence of a tertiary pyridine base at about 75° C. until esterification of the 18β-hydroxyl group is completed, boiling under reflux the resulting ester with a cyclizing agent selected from the group consisting of phosphorus oxychloride and thionylchloride to effect ring closure adding the reaction mixture to aqueous perchloric acid and cooling, separating the precipitated perchlorate from the aqueous mixture, and hydrogenating the 3,4-double bond in the resulting 3,4-dehydro-compound by the action of zinc in acetic acid.

2. In the process of preparing 3α and 3β epimers of 20α-yohimbanes of the following structural formula

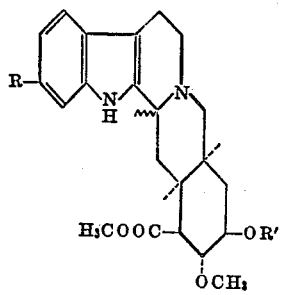

wherein R is a member selected from the group consisting of hydrogen and the methoxyl group and R' is an acyl radical selected from the group consisting of 3,4,5-trimethoxy benzoyl and 3,4,5-trimethoxy cinnamoyl radicals, the steps which comprise heating and 18β-hydroxy-17αmethoxy-16β-methoxy carbonyl-3-oxo-2,3-seco-20α-yohimbane of the formula

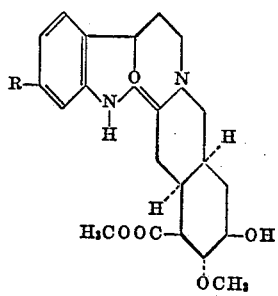

wherein R is a member selected from the group consisting of hydrogen and the methoxyl group, with a carboxylic acid chloride selected from the group consisting of 3,4,5-trimethoxy benzoylchloride and 3,4,5-trimethoxy cinnamoylchloride in the presence of a tertiary pyridine base at about 75° C. until esterification of the 18β-hydroxyl group is completed, boiling under reflux the resulting ester with a cyclizing agent selected from the group consisting of phosphorus oxychloride and thionylchloride to effect ring closure, cooling the esterification mixture to room temperature, diluting the cooled mixture with ice, adding perchloric acid to the ice-cooled mixture, separating the precipitated perchlorate from the aqueous mixture and hydrogenating the 3,4-double bond in the resulting perchlorate of the 3,4-dehydro compound by the action of zinc in acetic acid.

3. In a process of preparing deserpidine, the steps which comprise heating the dextrorotatory 18β-hydroxy-17α-methoxy-16β-methoxy carbonyl-3-oxo-2,3-seco-20α-yohimbane with 3,4,5-trimethoxy benzoylchloride in the presence of a tertiary pyridine base at about 75° C. until esterification of the 18β-hydroxyl group is completed, boiling under reflux the resulting ester with phosphorus oxychloride to effect ring closure to 3,4-dehydrodeserpidine, cooling the esterification mixture to room temperature, diluting the cooled mixture with ice, adding perchloric acid to the ice-cooled mixture, separating the precipitated 3,4-dehydrodeserpidine perchlorate from the aqueous mixture, and hydrogenating the 3,4-double bond in the resulting perchlorate by the action of zinc in acetic acid.

4. In a process of preparing rescinnamine, the steps which comprise heating the dextrorotatory 18β-hydroxy-11,17α-dimethoxy-16β-methoxy carbonyl-3-oxo-2,3-seco-20α-yohimbane with 3,4,5-trimethoxy cinnamoylchloride in the presence of a tertiary pyridine base at about 75° C. until esterification of the 18β-hydroxyl group is completed, boiling under reflux the resulting ester with phosphorus oxychloride to effect ring closure to 3,4-dehydrorescinnamine, cooling the esterification mixture to room temperature, diluting the cooled mixture with ice, adding perchloric acid to the ice-cooled mixture, separating the precipitated 3,4-dehydrorescinnamine perchlorate from the aqueous mixture, and hydrogenating the 3,4-double bond in the resulting perchlorate by the action of zinc in acetic acid.

5. In a process of preparing reserpine, the steps which comprise heating the dextrorotatory 18β-hydroxy-11,17α-dimethoxy-16β-methoxy carbonyl-3-oxo-2,3-seco-20α-yohimbane with 3,4,5-trimethoxy benzoylchloride in the presence of a tertiary pyridine base at about 75° C. until esterification of the 18β-hydroxyl group is completed, boiling under reflux the resulting ester with phosphorus oxychloride to effect ring closure to 3,4-dehydroreserpine, cooling the esterification mixture to room temperature, diluting the cooled mixture with ice, adding perchloric acid to the ice-cooled mixture, separating the precipitated 3,4-dehydroreserpine perchlorate from the aqueous mixture, and hydrogenating the 3,4-double bond in the resulting perchlorate by the action of zinc in acetic acid.

6. The optically active 17α-methoxy-16β-methoxy carbonyl-3-oxo-2,3-seco-20α-yohimbane of the formula

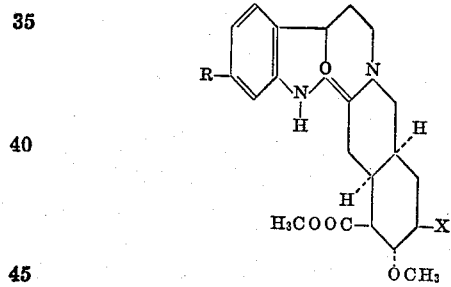

wherein X is a member selected from the group consisting of the 3,4,5-trimethoxy benzoyloxy group and the 3,4,5-trimethoxy cinnamoyloxy group, and R is a member selected from the group consisting of hydrogen and the methoxyl group.

References Cited in the file of this patent

FOREIGN PATENTS 744,290    Great Britain _____ Feb. 1, 1956

OTHER REFERENCES

Woodward: Jour. Am. Chem. Soc., vol. 78, pp. 2023–2025, May 5, 1956.

Weisenborn: Jour. Am. Chem. Soc., vol. 78, pp. 2021–2022, May 5, 1956.

MacPhillamy: Jour. Am. Chem. Soc., vol. 77, pages 4335 and 4338, August 20, 1955.

UNITED STATES PATENT OFFICE
Certificate of Correction

Patent No. 2,929,817                                                                      March 22, 1960

Robert Joly et al.

It is hereby certified that error appears in the printed specification of the above numbered patent requiring correction and that the said Letters Patent should read as corrected below.

Column 4, line 1, for "3,4-dehydroreserpidine" read —3,4-dehydrodeserpidine—; line 5, for "lactona" read —lactone—; column 5, line 74, for "ovychloride" read —oxychloride—; column 6, line 64, strike out "C.", second occurrence; column 7, lines 24 and 67, strike out "C.", second occurrence; column 8, line 43, strike out "C."; line 63, for "(OCH₃)₃" read — (OCH₃)₃) —; column 9, line 6, strike out "C.", third occurrence; lines 51 and 54, strike out "C.", each occurrence; column 10, line 26, strike out "C.", second occurrence; line 42, strike out "C."; column 11, lines 7 and 69, strike out "C.", each occurrence; line 29, for "370 C." read —37°—; column 12, line 7, strike out "C.", second occurrence; line 43 and column 13, line 19, for "and", each occurrence, read —an—; same column 13, line 20, for "17αmethoxy-" read —17α-methoxy- —; column 13, lines 22 to 34, the formula should appear as shown below instead of as in the patent:

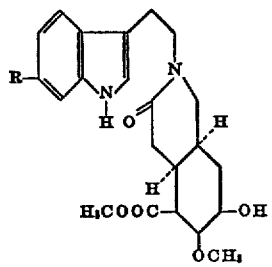

column 14, lines 34 to 45, the formula should appear as shown below instead of as in the patent:

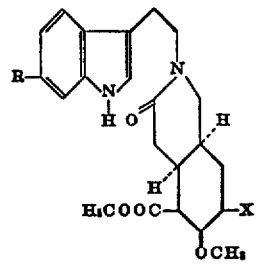

Signed and sealed this 15th day of November 1960.

[SEAL]

Attest:
KARL H. AXLINE,
*Attesting Officer.*

ROBERT C. WATSON,
*Commissioner of Patents*